US010323697B2

(12) United States Patent
Schilder et al.

(10) Patent No.: US 10,323,697 B2
(45) Date of Patent: Jun. 18, 2019

(54) MULTI-STAGE TRANSMISSION

(71) Applicant: Daimler AG, Stuttgart (DE)

(72) Inventors: Tobias Schilder, Stuttgart (DE); Klaus Riedl, Tuebingen (DE); Juergen Schweitzer, Filderstadt (DE); Recep Tevetoglu, Stuttgart (DE); Roland Lotter, Korb (DE)

(73) Assignee: Daimler AG, Stuttgart (DE)

( * ) Notice: Subject to any disclaimer, the term of this patent is extended or adjusted under 35 U.S.C. 154(b) by 560 days.

(21) Appl. No.: 14/900,579

(22) PCT Filed: May 7, 2014

(86) PCT No.: PCT/EP2014/001217
§ 371 (c)(1),
(2) Date: Dec. 21, 2015

(87) PCT Pub. No.: WO2014/202166
PCT Pub. Date: Dec. 24, 2014

(65) Prior Publication Data
US 2016/0201765 A1 Jul. 14, 2016

(30) Foreign Application Priority Data

Jun. 22, 2013 (DE) .................... 10 2013 010 523
Jul. 11, 2013 (DE) .................... 10 2013 011 569

(51) Int. Cl.
*F16H 3/66* (2006.01)
*F16D 23/06* (2006.01)
(Continued)

(52) U.S. Cl.
CPC ............ *F16D 23/06* (2013.01); *F16D 25/14* (2013.01); *F16H 3/66* (2013.01); *F16H 61/0265* (2013.01);
(Continued)

(58) Field of Classification Search
CPC ....... F16H 2057/085; F16H 2200/2012; F16H 2200/2015; F16H 2200/2017
See application file for complete search history.

(56) References Cited

U.S. PATENT DOCUMENTS 4,531,428 A * 7/1985 Windish .................... F16H 3/66
475/279
7,582,039 B2 * 9/2009 Iwasaki ..................... F16H 3/66
475/280
(Continued)

FOREIGN PATENT DOCUMENTS

DE  10 2008 000 207      *  8/2009
DE  10 2008 000 207 A1     8/2009
(Continued)

OTHER PUBLICATIONS

PCT/EP2014/001217, International Search Report (PCT/ISA/220 and PCT/ISA/210) dated Aug. 20, 2014, with partial English translation, enclosing Written Opinion of the International Searching Authority (PCT/ISA/237) (Thirteen (13) pages).
(Continued)

*Primary Examiner* — Sherry L Estremsky
(74) *Attorney, Agent, or Firm* — Crowell & Moring LLP

(57) ABSTRACT

A multi-stage transmission having at least four planetary gear stages which are disposed one behind the other along a main axis of rotation and which in each case have a sun gear, a planetary gear support, and a ring gear is disclosed. The multi-stage transmission has a bearing which supports the sun gear of the second planetary gear stage and the ring gear of the third planetary gear stage axially with respect to one another.

10 Claims, 2 Drawing Sheets

(51) Int. Cl.
   *F16D 48/02*   (2006.01)
   *F16H 61/02*   (2006.01)
   *F16D 21/00*   (2006.01)
   *F16D 25/10*   (2006.01)

(52) U.S. Cl.
   CPC .............. *F16D 21/00* (2013.01); *F16D 25/10* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01); *Y10T 477/6933* (2015.01); *Y10T 477/6936* (2015.01)

(56) References Cited

U.S. PATENT DOCUMENTS

| | | | |
|---|---|---|---|
| 8,425,370 B2 | 4/2013 | Leesch et al. | |
| 8,858,387 B2 | 10/2014 | Haupt et al. | |
| 9,140,334 B2* | 9/2015 | Sugino | F16H 57/08 |
| 9,255,627 B2* | 2/2016 | Shibamura | F16H 3/66 |
| 2007/0161453 A1 | 7/2007 | Iwasaki et al. | |
| 2009/0312138 A1* | 12/2009 | Illerhaus | F16H 3/66 |
| | | | 475/269 |

FOREIGN PATENT DOCUMENTS

| | | |
|---|---|---|
| DE | 10 2008 055 626 A1 | 5/2010 |
| DE | 10 2009 001 253 B3 | 6/2010 |
| JP | 9-280328 A | 10/1997 |
| WO | WO 2008/012170 A1 | 1/2008 |

OTHER PUBLICATIONS

Japanese Office Action issued in Japanese counterpart application No. 2016-520297 dated Sep. 20, 2016, with partial English translation (Six (6) pages).

* cited by examiner

MULTI-STAGE TRANSMISSION

BACKGROUND AND SUMMARY OF THE INVENTION

The invention relates to a multi-stage transmission.

A multi-stage transmission having at least four planetary gear stages which are disposed one behind the other along a main axis of rotation, and in each case have a sun gear, a planetary gear support and a ring gear, is already known from DE 10 2008 055 626 A1.

The object of the invention is in particular to provide a mounting design for the multi-stage transmission known from DE 10 2008 055 626 A1 and also with the kinematically related multi-stage transmission known from DE 10 2008 055 626 A1.

The invention is based on a multi-stage transmission having at least four planetary gear stages which are disposed one behind the other along a main axis of rotation, and in each case have a sun gear, a planetary gear support and a ring gear.

It is proposed that the multi-stage transmission has a bearing which supports the sun gear of the second planetary gear stage and the ring gear of the third planetary gear stage axially with respect to one another. As a result, components which exhibit low relative speeds, in particular in forward gears in which high speeds of a drive motor are reached, can be supported with respect to one another so that, in particular, losses in the bearings can be kept low. As a result an optimized mounting design, in particular with regard to consumption, can be provided so that in particular operating costs can be lowered. In this case "supported axially with respect to one another" should in particular be understood to mean that the bearing is provided in order to transmit a force acting along the main axis of rotation. "Provided" should be understood in particular to mean specially programmed, designed and/or equipped. In this context, a "main axis of rotation" should be understood in particular to mean a common axis of rotation of the planetary gear stages. The multi-stage transmission preferably includes a gear shift unit with at least one coupling element and an intermediate shaft which connects the coupling element and the sun gear of the second planetary gear stage permanently to one another in a rotationally fixed manner and forms a bearing support element on the input side for the bearing. Moreover it is advantageous if the multi-stage transmission has a support element which is permanently connected in a rotationally fixed manner to the ring gear of the third planetary gear stage and forms a bearing support element on the output side for the bearing.

Furthermore, it is proposed that the multi-stage transmission has a second bearing which supports the sun gear of the second planetary gear stage and the planetary gear support of the second planetary gear stage axially with respect to one another. As a result, the mounting design can be further optimized. Here, the multi-stage transmission preferably includes an intermediate shaft which connects the ring gear of the first planetary gear stage and the planetary gear support of the second planetary gear stage permanently to one another in a rotationally fixed manner and forms a bearing support element on the input side for the second bearing. Moreover, it is advantageous if the intermediate shaft which connects the coupling element and the sun gear of the second planetary gear stage permanently to one another in a rotationally fixed manner forms a bearing support element on the output side for the second bearing.

It is also proposed that the multi-stage transmission has a third bearing which supports the ring gear of the third planetary gear stage and the planetary gear support of the third planetary gear stage axially with respect to one another. As a result, in particular in connection with the first bearing and the second bearing, the number of bearings required can be limited to a total of eleven bearings, so that the multi-stage transmission can also be optimized with regard to the production costs. In this case, the multi-stage transmission preferably includes a further gear shift unit with at least one coupling element and a transmission output shaft which connects the planetary gear support of the third planetary gear stage and the coupling element permanently to one another in a rotationally fixed manner and forms a bearing support element on the output side for the third bearing. Moreover, it is advantageous if the support element which is permanently connected in a rotationally fixed manner to the planetary gear support forms a bearing support element on the input side for the third bearing.

Furthermore, it is proposed that at least the bearing which supports the sun gear of the second planetary gear stage and the ring gear of the third planetary gear stage axially with respect to one another is disposed inside an inscribed circle diameter of the ring gear of the second planetary gear stage and/or inside an inscribed circle diameter of the ring gear of the third planetary gear stage. As a result, in particular, bending moments can be reduced, so that a significantly more stable support can be achieved. Particularly advantageously, at least the bearing which supports the sun gear of the second planetary gear stage and the ring gear of the third planetary gear stage axially with respect to one another is disposed inside a circular path on which the planetary gear support of the second planetary gear stage carries planetary gears around the sun gear of the second planetary gear stage.

Moreover it is proposed that the first bearing, the second bearing and the third bearing are disposed axially immediately adjacent to one another. In this way axial forces which act on one of the bearings can be transmitted to the immediately adjacent bearing and are supported thereby, so that in particular bending moments which can lead to a distortion of components supported by the bearings can reduced or avoided. "Immediately adjacent" should in particular be understood to mean that the bearings are axially spaced apart from one another by a distance which is smaller than a width of the planetary gear stages disposed axially adjacent to one another. Axially adjacent bearings have an average diameter which is at least substantially the same, wherein "at least substantially the same" should be understood to mean that the average diameters differ from one another by at most 20%.

Further advantages can be seen from the following description of the figures. An exemplary embodiment of the invention is shown in the figures. The figures, the description of the figures and the claims contain numerous characteristics in combination. Expediently, the person skilled in the art will also consider the features singly and combine them to form meaningful further combinations.

DETAILED DESCRIPTION OF THE DRAWINGS

Figure 1:
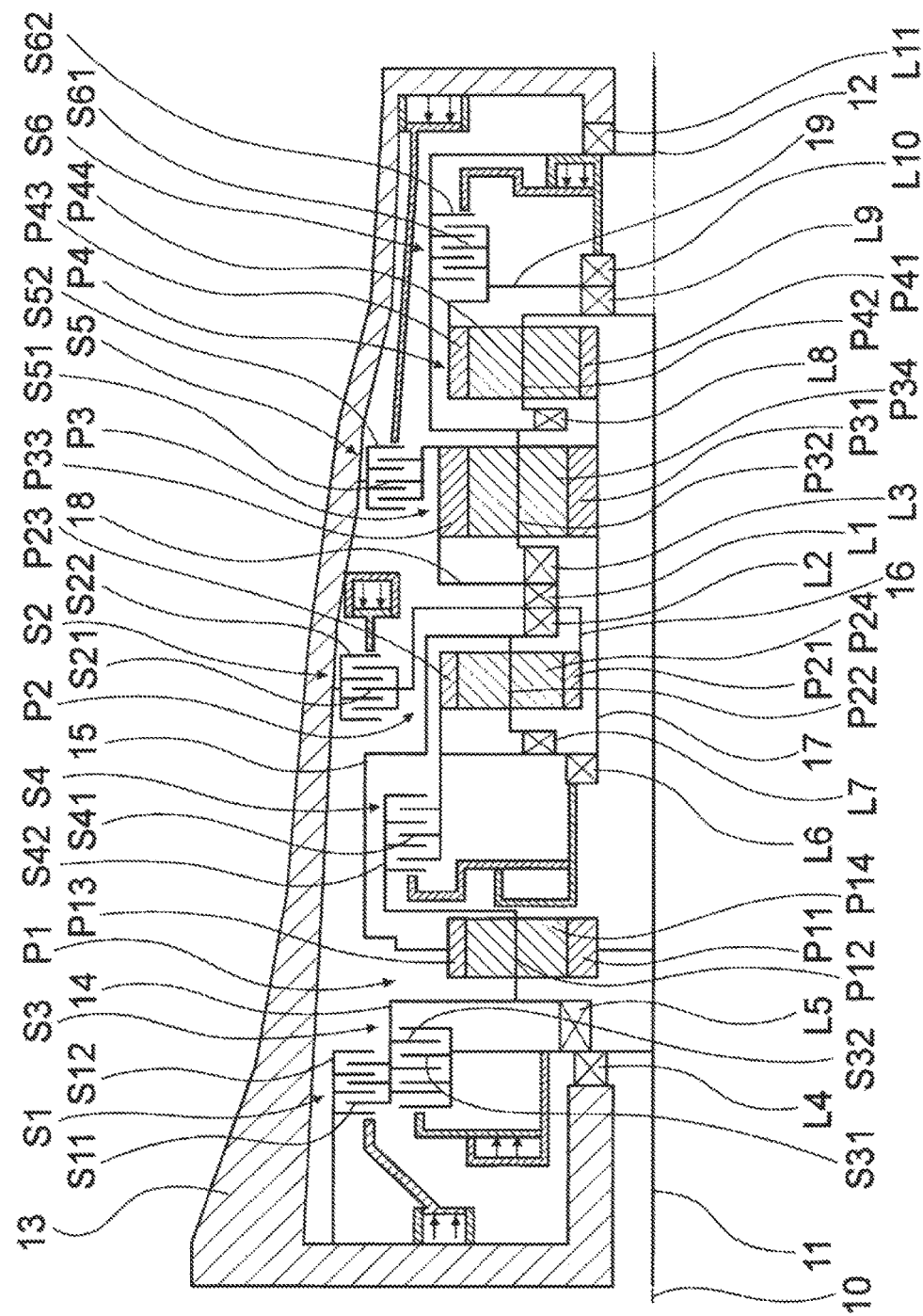
FIG. 1 shows a transmission diagram of a multi-stage transmission with a mounting design.
Figure 2:
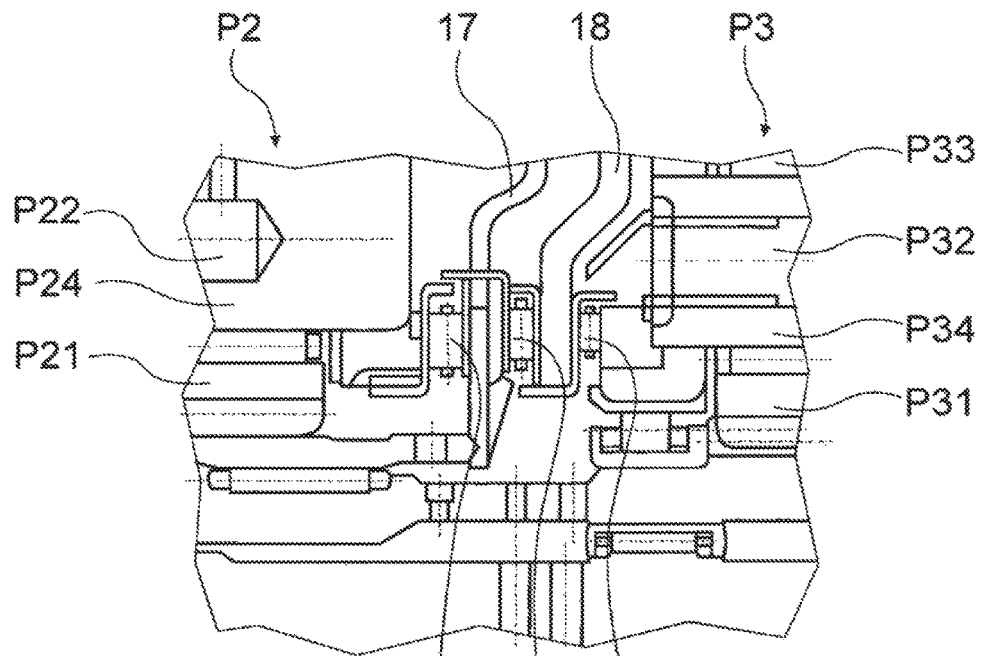
FIG. 2 shows a bearing arrangement in cross-section.
Figure 3:
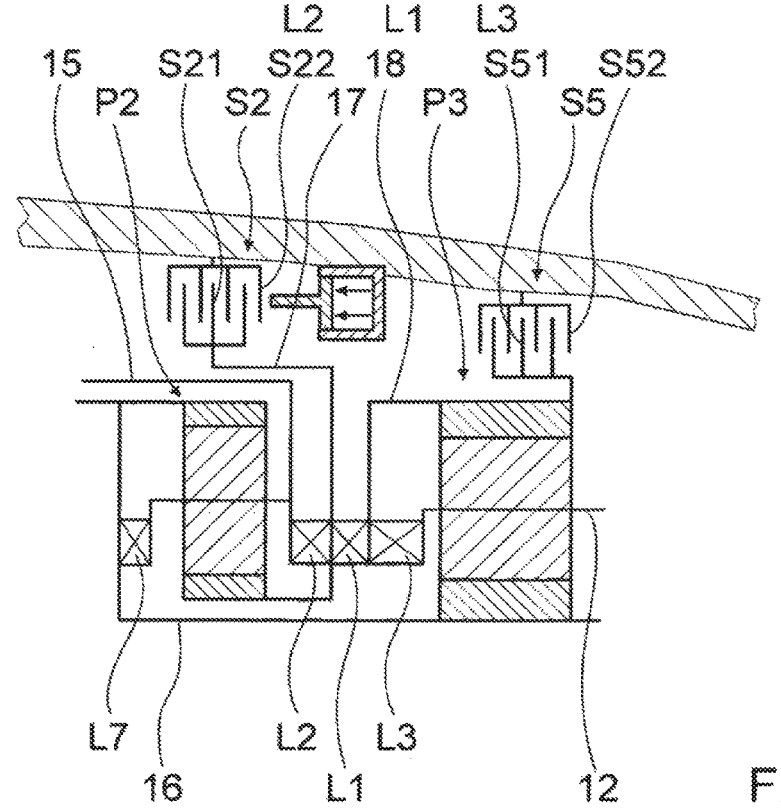
FIG. 3 shows a schematic representation of the bearing arrangement according to FIG. 2.

FIG. 1 shows a multi-stage transmission for a motor vehicle. The multi-stage transmission has four planetary gear stages P1, P2, P3, P4. The first planetary gear stage P1, the second planetary gear stage P2, the third planetary gear stage P3 and the fourth planetary gear stage P4 are disposed one behind the other along a main axis of rotation 10. All the planetary gear stages P1, P2, P3, P4 of the multi-stage transmission have a single planetary gear set. The multi-stage transmission has six gear shift units S1, S2, S3, S4, S5, S6. These are designed at least to shift nine forward transmission gears V1, V2, V3, V4, V5, V6, V7, V8, V9. A multi-stage transmission which corresponds kinematically to the multi-stage transmission described below is known from DE 10 2008 055 626 A1, the content of the disclosure of which is expressly incorporated by reference herein. Therefore in particular with regard to a switching logic of the forward transmission gears V1, V2, V3, V4, V5, V6, V7, V8, V9 explicit reference should be made to DE 10 2008 055 626 A1.

The multi-stage transmission is provided in order to connect a drive motor (not illustrated in greater detail) of a motor vehicle to drive wheels (not illustrated in greater detail) of the motor vehicle. By means of the multi-stage transmission a transmission ratio can be set between the drive motor and the drive wheels. The multi-stage transmission can be connected to a hybrid drive module, by means of which the driving torque can be changed. Furthermore by means of the hybrid drive module and the multi-stage transmission a CVT can be produced, so that a multi-stage transmission can be produced, of which the transmission ratio can be continuously adjusted at least in part-zones.

The multi-stage transmission has a gear input shaft 11 which is provided in order to introduce a driving torque into the multi-stage transmission. The transmission input shaft 11 is provided in order to be connected to the drive motor in a rotationally fixed manner. Furthermore the multi-stage transmission has a gear output shaft 12 which is provided in order to take off a driving torque from the multi-stage transmission. The transmission output shaft 12 is provided in order to be connected to drive wheels of the motor vehicle. The transmission input shaft 11 and the transmission output shaft 12 are disposed coaxially relative to one another on opposing sides.

The first planetary gear stage P1 is disposed on the input side. The first planetary gear stage P1 has a single planetary gear set. The planetary gear stage P1 includes a first sun gear P11, a first ring gear P13 and a first planetary gear support P12. The planetary gear support P12 carries planetary gears P14 on a circular path. The planetary gears P14 mesh with the sun gear P11 and with the ring gear P13. The planetary gears P14 are rotatably supported on the planetary gear support P12.

The second planetary gear stage P2 is disposed centrally on the input side. The second planetary gear stage P2 has a single planetary gear set. The second planetary gear stage P2 includes a second sun gear P21, a second ring gear P23 and a second planetary gear support P22. The planetary gear support P22 carries planetary gears P24 on a circular path. The planetary gears P24 mesh with the sun gear P21 and with the ring gear P23. The planetary gears P24 are rotatably supported on the planetary gear support P22.

The third planetary gear stage P3 is disposed centrally on the output side. The third planetary gear stage P3 has a single planetary gear set. The planetary gear stage P3 includes a third sun gear P31, a third ring gear P33 and a third planetary gear support P32. The planetary gear support P32 carries planetary gears P34 on a circular path. The planetary gears P34 mesh with the sun gear P31 and with the ring gear P33. The planetary gears P34 are rotatably supported on the planetary gear support P32.

The fourth planetary gear stage P4 is disposed on the output side. The fourth planetary gear stage P4 has a single planetary gear set. The planetary gear stage P4 includes a fourth sun gear P41, a fourth ring gear P43 and a fourth planetary gear support P42. The planetary gear support P42 carries planetary gears P44 on a circular path. The planetary gears P44 mesh with the sun gear P41 and with the ring gear P43. The planetary gears P44 are rotatably supported on the planetary gear support P42.

The three gear shift units S3, S4, S6 are designed as coupling units. They each have a first rotatable coupling element S31, S41, S61 and a second rotatable coupling element S32, S42, S62. The three gear shift units S3, S4, S6 are in each case provided in order to connect their two coupling elements S31, S32, S41, S42, S61, S62 to one another in a rotationally fixed manner.

The three gear shift units S1, S2, S5 are designed as brake units and in each case have a first coupling element S11, S21, S51 which is disposed so as to be rotatable and a second coupling element S12, S22, S52 disposed in a rotationally fixed manner. The gear shift units S1, S2, S5 are provided in each case in order to connect their first coupling element S11, S21, S51, which is disposed so as to be rotatable, to the second coupling element S21, S22, S52, which is disposed in a rotationally fixed manner, and thus to a transmission housing 13.

The gear shift units S1, S2, S5 which are designed as brake units, as well as the gear shift unit S3 which is designed as a coupling unit, are designed to be located externally. The gear shift units S4, S6 which are designed as coupling units are designed to be located internally. The gear shift units S1, S3 are disposed in the axial direction on the input side of the first planetary gear stage P1. The gear shift unit S4 is disposed in the axial direction between the first planetary gear stage P1 and the secondary planetary gear stage P2. The gear shift unit S2 is disposed in the axial direction at the height of the second planetary gear stage P2. The gear shift unit S5 is disposed in the axial direction at the height of the third planetary gear stage P3. The gear shift unit S6 is disposed on the output side of the fourth planetary gear stage P4.

For connection of the planetary gear stages P1, P2, P3, P4 to one another and to the gear shift units S1, S2, S3, S4, S5, S6 the multi-stage transmission has four intermediate shafts 14, 15, 16, 17 in addition to the transmission input shaft 11 and the transmission output shaft 12. For actuation of the gear shift units S1, S2, S3, S4, S5, S6 the multi-stage transmission includes six actuators which are in each case associated with one of the gear shift units S1, S2, S3, S4, S5, S6.

The transmission input shaft 11 connects the first coupling element S31 of the gear shift unit S3, the first sun gear P11 and the fourth planetary gear support P42 permanently to one another in a rotationally fixed manner. The transmission input shaft 11 is directed radially outwards for attachment of the coupling element S31 on the input side to the first planetary gear stage P1. The first sun gear P11 is permanent disposed in a rotationally fixed manner on the transmission input shaft 11. For attachment of the fourth planetary gear support P42 the transmission input shaft 11 passes through all the planetary gear stages P1, P2, P3, P4 and is attached on the output side to the fourth planetary gear support P42.

The intermediate shaft 14 connects the first coupling element S11 of the gear shift unit S1, the second coupling element S32 of the gear shift unit S3, the first planetary gear support P12 and the second coupling element S42 of the gear shift unit S4 to one another. For attachment of the coupling elements S11, S32 the intermediate shaft 14 is directed radially outwards on the input side of the first planetary gear stage P1. For attachment of the coupling element S42 the intermediate shaft 14 is passed through the first planetary gear stage P1.

The intermediate shaft 15 connects the first ring gear P13 and the second planetary gear support P22 permanently to one another in a rotationally fixed manner. For this purpose the intermediate shaft 15 is guided radially outwards around the gear shift unit S4 and the second planetary gear stage P2. The intermediate shaft 15 is configured in the form of a cup.

The intermediate shaft 16 connects the second sun gear P21 and the first coupling element S21 of the second gear shift unit S2 permanently to one another in a rotationally fixed manner. For attachment of the coupling element S21 the intermediate shaft 16 is directed radially outwards between the second planetary gear stage P2 and the third planetary gear stage P3.

The intermediate shaft 17 connects the first coupling element S41 of the fourth gear shift unit S4, the second ring gear P23, the third sun gear P31 and the fourth sun gear P41 permanently to one another in a rotationally fixed manner. For attachment of the coupling element S41 and the ring gear P23 the intermediate shaft 17 is directed radially outwards between the first planetary gear stage P1 and the second planetary gear stage P2. For attachment of the sun gears P31, P41 the intermediate shaft 17 passes through the second sun gear P21. The third sun gear P31 and the fourth sun gear P41 are disposed directly on the intermediate shaft 17.

The transmission output shaft 12 connects the third planetary gear support P32 and the second coupling element S62 of the sixth gear shift unit S6 permanently to one another in a rotationally fixed manner. For attachment of the third planetary gear support P32 the transmission output shaft 12 is directed radially inwards between the third planetary gear stage P3 and the fourth planetary gear stage P4. The transmission output shaft 12 delimits the multi-stage transmission on the output side.

By means of the gear shift unit S3 the sun gear P11 and the first planetary gear support P12 can be connected to one another in a rotationally fixed manner, so that the first planetary gear stage P1 can be blocked by means of the gear shift unit S3. By means of the gear shift unit S4 the second ring gear P23 and the first planetary gear support P12 can be connected to one another in a rotationally fixed manner. Moreover the first ring gear P13 and the second planetary gear support P22 are continuously connected to one another in a rotationally fixed manner. By engagement of the gear shift units S3 and S4 the first planetary gear stage P1 and the second planetary gear stage P2 can be interlocked with one another.

The forward transmission gears V1-V9 are shifted by means of the gear shift units S1, S2, S3, S4, S5, S6. In the forward transmission gears V1-V9 in each case at most three of the gear shift units S1, S2, S3, S4, S5, S6 are engaged, whilst the rest of the gear shift units S1, S2, S3, S4, S5, S6 are disengaged. In a shifting operation of one of the forward transmission gears V1-V9 into an adjacent forward transmission gear V1-V9, for example in each case at most two of the gear shift units S1, S2, S3, S4, S5, S6 are changed. In each shifting operation from one of the forward transmission gears V1-V9 into an adjacent forward transmission gear V1-V9, in each case two already engaged gear shift units S1, S2, S3, S4, S5, S6 remain engaged.

For support the multi-stage transmission includes a plurality of bearings L1-L11. The bearings L1-L11 are in each case designed as axial bearings which are provided in particular for supporting axial forces acting along the main axis of rotation 10. Radial bearings, in particular for supporting the transmission input shaft 11 and the transmission output shaft 12, are not illustrated in greater detail. The bearings L1-L11 form an axial support for axially supporting all the rotatably disposed components.

The first bearing L1 supports the sun gear P21 of the second planetary gear stage P2 and the ring gear P33 of the third planetary gear stage P3 axially with respect to one another. The intermediate shaft 16 which connects the first coupling element S21 of the second gear shift unit S2 and the second sun gear P21 permanently to one another in a rotationally fixed manner forms a bearing support element on the input side for the first bearing L1. Furthermore the multi-stage transmission includes a support element 18 permanently connected in a rotationally fixed manner to the third ring gear P33 as well as the first coupling element S51 of the gear shift unit S5, said support element 18 forming a bearing support element on the output side for the first bearing L1. The support element 18 is guided radially inwards starting from the third ring gear P33 between the second planetary gear stage P2 and the third planetary gear stage P3 and on its radially inner end forms the support element on the output side for the bearing L1. In a region in which it is guided radially outwards between the second planetary gear stage P2 and the third planetary gear stage P3, the intermediate shaft 16 forms the bearing support element on the input side for the first bearing L1.

The second bearing L2 supports the sun gear P21 of the second planetary gear stage P2 and the planetary gear support P22 of the second planetary gear stage P2 axially with respect to one another. The intermediate shaft 15 which connects the first ring gear P13 and the second planetary gear support P22 permanently to one another in a rotationally fixed manner forms a bearing support element on the input side against which the second bearing L2 is supported. The intermediate shaft 16 which connects the first coupling element S21 of the second gear shift unit S2 and the second sun gear P21 permanently to one another in a rotationally fixed manner forms a bearing support element on the output side for the second bearing L2. The bearing support element of the second bearing L2 on the output side is disposed on an opposing side of the intermediate shaft 16 in relation to the bearing support element on the input side for the bearing L1. The intermediate shaft 15 is guided radially inwards in order to form the bearing support element on the input side for the bearing L2 by means of the second planetary gear support P22.

The third bearing L3 supports the ring gear P33 of the third planetary gear stage P3 and the planetary gear support P32 of the third planetary gear stage P3 axially with respect to one another. The transmission output shaft 12 which connects the third planetary gear support P32 and the second coupling element S62 of the sixth gear shift unit S6 permanently to one another in a rotationally fixed manner forms a bearing support element on the output side for the third bearing L3. The support element 18 which is permanently connected to the third planetary gear support P32 in a rotationally fixed manner forms a bearing support element on the input side for the third bearing L3. The bearing support element of the third bearing L3 on the input side is disposed on an opposing side of the transmission output shaft 12 in relation to the bearing support element on the output side for the bearing L1. The transmission output shaft 12 is passed through the third planetary gear support P32 in order to form the bearing support element on the output side.

The fourth bearing L4 supports the transmission housing 13 and the first coupling element S31 of the third gear shift unit S3 axially with respect to one another. The transmission housing 13 forms a bearing support element on the input side for the fourth bearing L4. The transmission input shaft 11 which connects the first coupling element S31 of the third gear shift unit S3, the first sun gear P11 and the fourth planetary gear support P42 permanently to one another in a rotationally fixed manner forms a bearing support element on the output side for the fourth bearing L4.

The fifth bearing L5 supports the first coupling element S31 of the third gear shift unit S3 and the planetary gear support P12 of the first planetary gear stage P1 axially with respect to one another. The transmission input shaft 11 which connects the first coupling element S31 of the third gear shift unit S3, the first sun gear P11 and the fourth planetary gear support P42 permanently to one another in a rotationally fixed manner forms a bearing support element on the input side for the fourth bearing L4. The intermediate shaft 14 which connects the first coupling element S11 of the first gear shift unit S1, the second coupling element S32 of the third gear shift unit S3, the first planetary gear support P12 and the second coupling element S42 of the fourth gear shift unit S4 permanently to one another in a rotationally fixed manner forms a bearing support element on the output side for the fifth bearing L5. The intermediate shaft 14 is guided radially inwards in order to form the bearing support element on the output side for the bearing L5 by means of the first planetary gear support P12.

The sixth bearing L6 supports the planetary gear support P12 of the first planetary gear stage P1 and the ring gear P23 of the second planetary gear stage P2 axially with respect to one another. The actuator for actuation of the gear shift unit S4 is supported against the intermediate shaft 14 which connects the first coupling element S11 of the first gear shift unit S1, the second coupling element S32 of the third gear shift unit S3, the first planetary gear support P12 and the second coupling element S42 of the fourth gear shift unit S4 permanently to one another in a rotationally fixed manner. The actuator forms a bearing support element on the input side for the sixth bearing L6. The intermediate shaft 17 which connects the first coupling element S41 of the fourth gear shift unit S4, the second ring gear P23, the third sun gear P31 and the fourth sun gear P41 permanently to one another in a rotationally fixed manner forms a support element on the output side for the sixth bearing L6.

The seventh bearing L7 supports the ring gear P23 of the second planetary gear stage P2 and the planetary gear support P22 of the second planetary gear stage P2 axially with respect to one another. The intermediate shaft 17 which connects the first coupling element S41 of the fourth gear shift unit S4, the second ring gear P23, the third sun gear P31 and the fourth sun gear P41 permanently to one another in a rotationally fixed manner forms a support element on the input side for the seventh bearing L7. The intermediate shaft 15 which connects the first ring gear P13 and the second planetary gear support P22 permanently to one another in a rotationally fixed manner forms a bearing support element on the output side for the seventh bearing L7. The intermediate shaft 15 is guided through the second planetary gear support P12 and radially inwards in order to form the bearing support element on the output side.

The eighth bearing L8 supports the planetary gear support P32 of the third planetary gear stage P3 and the planetary gear support P42 of the fourth planetary gear stage P4 axially with respect to one another. The transmission output shaft 12 which connects the third planetary gear support P32 and the second coupling element S62 of the sixth gear shift unit S6 permanently to one another in a rotationally fixed manner forms a support element on the input side for the eighth bearing L8. The transmission input shaft 11 which connects the first coupling element S31 of the third gear shift unit S3, the first sun gear P11 and the fourth planetary gear support P42 permanently to one another in a rotationally fixed manner forms a bearing support element on the output side for the eighth bearing L8.

The ninth bearing L9 supports the planetary gear support P42 of the fourth planetary gear stage P4 and the ring gear P43 of the fourth planetary gear stage P4 axially with respect to one another. The transmission input shaft 11 which connects the first coupling element S31 of the third gear shift unit S3, the first sun gear P11 and the fourth planetary gear support P42 permanently to one another in a rotationally fixed manner forms a bearing support element on the input side for the ninth bearing L9. The multi-stage transmission includes a support element 19 which is permanently connected in a rotationally fixed manner to the fourth ring gear P43 and forms a bearing support element on the output side for the ninth bearing L9. The support element 19 is connected in a rotationally fixed manner to the first coupling element S61 of the gear shift unit S6.

The tenth bearing L10 supports the ring gear P43 of the fourth planetary gear stage P4 and the transmission output shaft 12 axially with respect to one another. The support element 19 which is permanently connected in a rotationally fixed manner to the fourth ring gear P43 forms a bearing support element on the input side for the tenth bearing L10. The transmission output shaft 12 which connects the third planetary gear support P32 and the second coupling element S62 of the sixth gear shift unit S6 permanently to one another in a rotationally fixed manner forms a bearing support element on the output side for the tenth bearing L10.

The eleventh bearing L11 supports the transmission output shaft 12 and the transmission housing 13 axially with respect to one another. The transmission output shaft 12 which connects the third planetary gear support P32 and the second coupling element S62 of the sixth gear shift unit S6 permanently to one another in a rotationally fixed manner forms a bearing support element on the input side for the eleventh bearing L11. The transmission housing 13 forms a bearing support element on the output side for the eleventh bearing L11.

The bearings L1-L11 are preferably designed as rolling element bearings. However, a configuration as a plain bearing is also conceivable at least to some extent. The bearing support elements themselves can be designed in principle as a receiving part for a bearing ring or can be designed integrally with the bearing ring. In an integral configuration the bearing support elements directly form the bearing ring which is provided for guiding rolling elements. In such a configuration for example the intermediate shaft 16 which forms the bearing support elements of the bearings L1, L2 has rolling surfaces for the rolling elements of the bearings L1, L2. In a multi-part configuration the bearing support elements preferably form receptacles which serve for fastening the bearing rings, for example by compression of the bearing rings with the corresponding intermediate shaft 14, 15, 16, 17.

The bearings L4, L5 are disposed on the input side of the first planetary gear stage P1. The bearings L6, L7 are disposed between the first planetary gear stage P1 and the second planetary gear stage P2. The bearings L1, L2, L3 are disposed between the second planetary gear stage P2 and the third planetary gear stage P3. The bearing L8 is disposed between the third planetary gear stage P3 and the fourth planetary gear stage P4. The bearings L9, L10, L11 are disposed on the output side of the fourth planetary gear stage P4. All the bearings L1-L11 are disposed radially inside an inscribed circle diameter of the respective adjacent ring gears P13, P23, P33, P43. The bearings L1, L2, L3 are for example disposed radially inside an inscribed circle diameter of the ring gears P23, P33.

The bearings L1, L2, L3 are disposed inside the circular path on which the planetary gear support P32 of the third planetary gear stage P3 guides the planetary gears P34. In particular the rolling surfaces of the bearings L1, L2, L3 are disposed radially inside the circular path on which the planetary gear supports P22, P32 in each case guide their planetary gears P24, P34. The rolling surfaces of the bearings L1, L2, L3 are disposed radially overlapping, i.e. in the radial direction the rolling surfaces of the bearings L1, L2, L3 are disposed at least to some extent in one and the same region.

The first bearing L1, the second bearing L2 and the third bearing L3 are disposed immediately adjacent to one another. Thus an axial force which acts on one of the bearings L1, L2, L3 acts is transmitted directly to the respective adjacent bearings L1, L2, L3, in particular without a bending force acting on the support element 18. The fourth bearing L4 and the fifth bearing L5 are likewise disposed immediately adjacent to one another. The sixth bearing L6 and the seventh bearing L7 are disposed radially offset from one another. The ninth bearing L9 and the tenth bearing L10 are disposed immediately adjacent to one another. The eleventh bearing L11, which is supported axially by means of the two bearings L9, L10, is disposed radially in one and the same region as the bearings L9, L10.

The invention claimed is:

1. A multi-stage transmission, comprising:
   at least a first, a second, a third, and a fourth planetary gear stage which are disposed one behind the other along a main axis of rotation and wherein each of the planetary gear stages has a respective sun gear, a planetary gear support, and a ring gear;
   a first bearing which supports the sun gear of the second planetary gear stage and the ring gear of the third planetary gear stage axially with respect to one another;
   a gear shift unit with a coupling element; and
   an intermediate shaft which connects the coupling element and the sun gear of the second planetary gear stage permanently to one another in a rotationally fixed manner and which forms a bearing support element on an input side for the first bearing.

2. The multi-stage transmission according to claim 1, further comprising a second bearing which supports the sun gear of the second planetary gear stage and the planetary gear support of the second planetary gear stage axially with respect to one another and wherein the intermediate shaft which connects the coupling element and the sun gear of the second planetary gear stage permanently to one another in a rotationally fixed manner forms a bearing support element on an output side for the second bearing.

3. A multi-stage transmission, comprising:
   at least a first, a second, a third, and a fourth planetary gear stage which are disposed one behind the other along a main axis of rotation and wherein each of the planetary gear stages has a respective sun gear, a planetary gear support, and a ring gear;
   a first bearing, disposed axially between the respective sun gears of the second and third planetary gear stages, which supports the sun gear of the second planetary gear stage and the ring gear of the third planetary gear stage axially with respect to one another; and
   a support element which is permanently connected in a rotationally fixed manner to the ring gear of the third planetary gear stage and forms a bearing support element on an output side for the first bearing.

4. A multi-stage transmission, comprising:
   at least a first, a second, a third, and a fourth planetary gear stage which are disposed one behind the other along a main axis of rotation and wherein each of the planetary gear stages has a respective sun gear, a planetary gear support, and a ring gear;
   a first bearing, disposed axially between the respective sun gears of the second and third planetary gear stages, which supports the sun gear of the second planetary gear stage and the ring gear of the third planetary gear stage axially with respect to one another; and
   a second bearing which supports the sun gear of the second planetary gear stage and the planetary gear support of the second planetary gear stage axially with respect to one another.

5. A multi-stage transmission, comprising:
   at least a first, a second, a third, and a fourth planetary gear stage which are disposed one behind the other along a main axis of rotation and wherein each of the planetary gear stages has a respective sun gear, a planetary gear support, and a ring gear;
   a first bearing which supports the sun gear of the second planetary gear stage and the ring gear of the third planetary gear stage axially with respect to one another;
   a second bearing which supports the sun gear of the second planetary gear stage and the planetary gear support of the second planetary gear stage axially with respect to one another; and
   an intermediate shaft which connects the ring gear of the first planetary gear stage and the planetary gear support of the second planetary gear stage permanently to one another in a rotationally fixed manner and forms a bearing support element on an input side for the second bearing.

6. A multi-stage transmission comprising:
   at least a first, a second, a third, and a fourth planetary gear stage which are disposed one behind the other along a main axis of rotation and wherein each of the planetary gear stages has a respective sun gear, a planetary gear support, and a ring gear;
   a first bearing which supports the sun gear of the second planetary gear stage and the ring gear of the third planetary gear stage axially with respect to one another;
   a second bearing which supports the sun gear of the second planetary gear stage and the planetary gear support of the second planetary gear stage axially with respect to one another; and
   a third bearing which supports the ring gear of the third planetary gear stage and the planetary gear support of the third planetary gear stage axially with respect to one another.

7. The multi-stage transmission according to claim 6, further comprising:

a gear shift unit with a coupling element; and a transmission output shaft which connects the planetary gear support of the third planetary gear stage and the coupling element permanently to one another in a rotationally fixed manner and which forms a bearing support element on an output side for the third bearing.

8. The multi-stage transmission according to claim 7, further comprising a support element which is permanently connected in a rotationally fixed manner to the ring gear of the third planetary gear stage and forms a bearing support element on an output side for the first bearing and wherein the support element which is permanently connected in a rotationally fixed manner to the ring gear of the third planetary gear stage forms a bearing support element on an input side for the third bearing.

9. The multi-stage transmission according to claim 8, wherein the first bearing, the second bearing, and the third bearing are disposed immediately adjacent to one another.

10. A multi-stage transmission, comprising:

at least a first, a second, a third, and a fourth planetary gear stage which are disposed one behind the other along a main axis of rotation and wherein each of the planetary gear stages has a respective sun gear, a planetary gear support, and a ring gear; and a first bearing, disposed axially between the respective sun gears of the second and third planetary gear stages, which supports the sun gear of the second planetary gear stage and the ring gear of the third planetary gear stage axially with respect to one another;

wherein the first bearing which supports the sun gear of the second planetary gear stage and the ring gear of the third planetary gear stage axially with respect to one another is disposed inside an inscribed circle diameter of the ring gear of the second planetary gear stage and/or inside an inscribed circle diameter of the ring gear of the third planetary gear stage.

* * * * *